Figure 1:
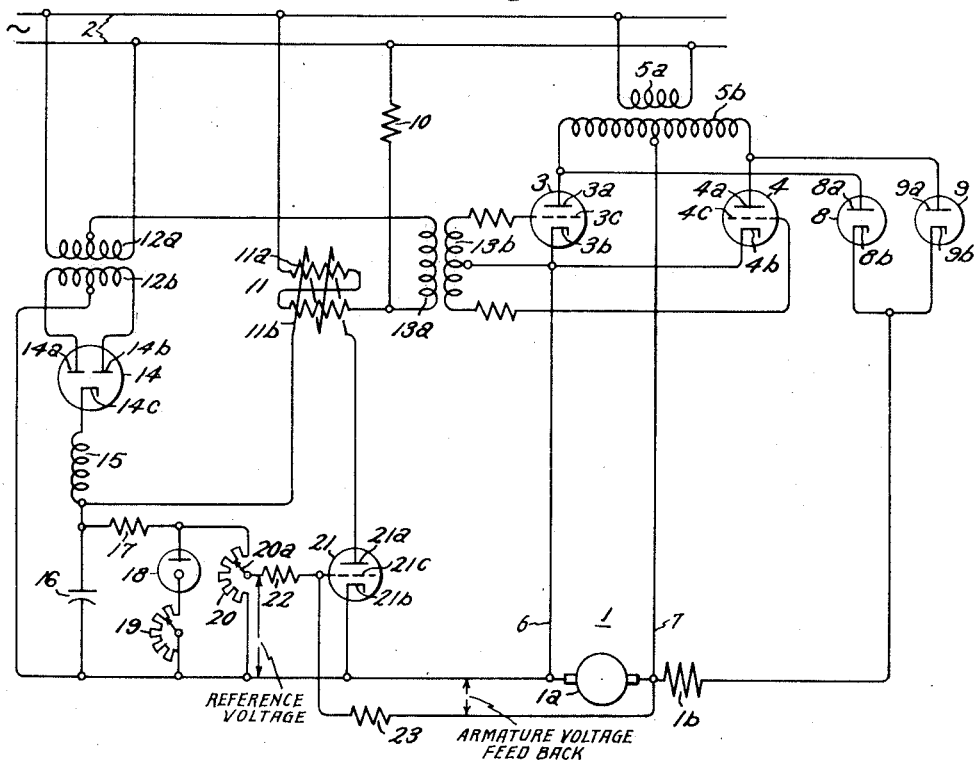

Oct. 20, 1953 L. H. DEE 2,656,500
ELECTRONIC MOTOR CONTROL SYSTEM
Filed Feb. 15, 1952

Inventor:
Leo H. Dee,
by Claude F. Mott
His Attorney.

Patented Oct. 20, 1953

2,656,500

UNITED STATES PATENT OFFICE 2,656,500

ELECTRONIC MOTOR CONTROL SYSTEM

Leo H. Dee, Schenectady, N. Y., assignor to General Electric Company, a corporation of New York Application February 15, 1952, Serial No. 271,794

2 Claims. (Cl. 318—331)

This invention relates to control systems, more particularly to electronic motor control systems and it has for an object the provision of a simple, reliable, and improved control system of this character.

More specifically, the invention relates to electronic control systems in which the field winding of the motor is supplied from an uncontrolled rectifier and in which a direct voltage is supplied to the armature and maintained substantially constant by means of a second rectifier controlled in response to the difference between a reference voltage and a speed signal voltage which is derived from the armature voltage.

In a motor control system of this character, the motor experiences a rise in speed in response to a decrease in line voltage owing to the resulting decrease in field current while the reference voltage and consequently, the armature voltage are maintained constant. The amount of speed change which the motor experiences depends upon the degree of saturation of the field structure. Usually in systems of this character, the motor is operated at a point on the saturated portion of the magnetization curve such that a 10% decrease in field current will produce approximately 5% decrease in field flux. As a result, the motor will experience approximately 5% rise in speed in response to a 10% decrease in line voltage. This is highly undesirable and, accordingly, a further object of the invention is the provision of a simple and inexpensive means for compensating for the changes in field flux which result from changes in line voltage while the armature voltage is maintained constant.

In carrying the invention into effect in one form thereof, the field of the motor is supplied from an uncontrolled rectifier and a voltage is supplied to the armature and maintained substantially constant by means of a rectifier controlled in response to the difference between a reference voltage and a control voltage derived from the armature voltage. The reference voltage is compensated by causing it to change with line voltage in an amount and sense that will cause the armature voltage percentage change to equal and counteract the resulting percentage change in field flux. In a preferred embodiment of the invention, the reference voltage unit comprises positive and negative reference voltage supply conductors, a rectifier supplied from the same alternating voltage source as that from which the motor field winding and armature winding are supplied, together with a voltage regulating type electric glow valve supplied with direct voltage from the rectifier. A resistor is connected in series with this glow valve. Connections are provided for deriving from the voltage drop across the glow valve and series resistor and supplying to the reference voltage supply conductors a voltage having a constant component proportional to the drop across the valve and a variable component proportional to the drop across the resistor which in turn is variable in accordance with variations in the line voltage.

Figure 2:
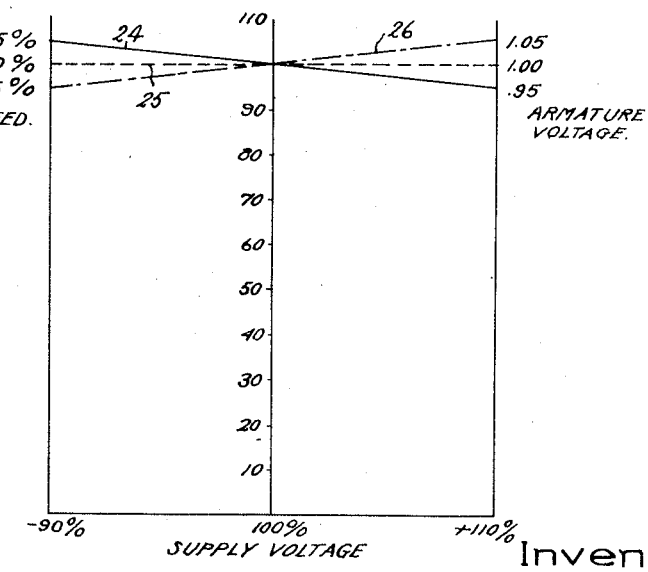

For a better and more complete understanding of the invention, reference should now be had to the following specification and to the accompanying drawing, of which Fig. 1 is a simple diagrammatical illustration of an embodiment of the invention and Fig. 2 is a chart of characteristic curves which facilitate an understanding of its operation.

Referring now to the drawing, a D. C. motor 1 having an armature 1a and a shunt-type field winding 1b is supplied from a source of alternating voltage comprising the supply conductors 2. A direct voltage is supplied to the armature 1a of the motor by means of a controlled diametric rectifier which is illustrated as comprising a pair of triode rectifier valves 3 and 4 which are supplied from the secondary winding of a supply transformer of which the primary winding 5a is connected to the supply conductors 2. The valves 3 and 4 are preferably thyratrons. Their anodes 3a and 4a are connected to the opposite terminals of the secondary winding 5b of the supply transformer and the cathodes 3b and 4b are connected to a conductor 6 which thus becomes the positive supply conductor for the motor armature. The conductor 7, which is connected to the center tap of the secondary winding 5b, constitutes the negative supply conductor for the armature. The armature is connected across the positive and negative supply conductors 6 and 7.

A direct voltage is supplied to the shunt field winding 1b by means of an uncontrolled diametric rectifier which is illustrated as comprising a pair of diode electric valves 8 and 9 of which the anodes 8a and 9a are connected to opposite terminals of the secondary winding 5b of the supply transformer. The cathodes 8b and 9b are connected to the positive terminal of the shunt field winding 1b of which the opposite terminal is connected to the conductor 7 and thence to the center tap of the secondary winding 5b.

The rectified output voltage of the thyratrons 3 and 4 is controlled by varying their firing point, i. e., varying the instant in the positive half cycle of anode voltage at which the grid voltage becomes less negative than the critical grid voltage. This is accomplished by supplying between the cathodes and grids of the thyratrons alternating voltages of which the phase with respect to the anode voltage is variable. For the purpose of varying the phase of the grid voltage of the thyratrons relative to the anode voltage, a phase shifting network is provided which is illustrated as comprising a resistor 10 and the alternating current winding 11a of a saturable core type reactor. The resistor 10 and the winding 11a are connected in series relation with each other across the supply conductors 2. Also connected across the supply conductors 2 is the primary winding 12a of a control voltage supply transformer, and between its center tap and the junction point of the resistor 10 and reactance winding 11a is connected the primary winding 13a of the grid transformer of which the secondary winding 13b is divided into two equal portions. One half of the secondary winding 13b is connected between the cathode 3b and the control electrode 3c of thyratron 3, and similarly the opposite half of the secondary winding is connected between the cathode 4b and the control electrode 4c of thyratron 4.

The phase shift of the grid voltage of the thyratron is produced by varying the reactance of the saturable core reactor 11, and this is accomplished by varying the saturation of the core. When the saturable reactor is saturated, the secondary voltages of the grid transformer 13 are approximately in phase with the anode voltages of the thyratrons and when the reactor is unsaturated, the grid voltages are out of phase lagging. Intermediate variations of saturation produce corresponding intermediate phase relationships. Thus when the saturable reactor 11 is fully saturated, the thyratrons 3 and 4 are fully conducting and, conversely, when the reactor is unsaturated, the thyratrons are substantially non-conducting. For intermediate values of saturation, the thyratrons have corresponding intermediate values of conductivity.

An auxiliary rectifier valve 14 is supplied from the secondary winding 12b of the control voltage transformer. Preferably the valve 14 is a double-diode valve having a pair of anodes 14a and 14b and a single cathode 14c within a single envelope. The anodes 14a and 14b are connected to opposite terminals of the secondary winding 12b. The direct voltage furnished by the rectifier 14 is filtered by means of a smoothing reactor 15 and a capacitor 16 which are connected in series relationship between the cathode 14c and the center tap of the secondary winding 12b. The voltage across the capacitor 16 is impressed on a circuit including a resistor 17, an electric glow valve 18 and a resistor 19 connected in series relationship. The glow valve is a gaseous discharge device which operates in that region of its characteristic in which the voltage drop across its anode and cathode terminals is substantially constant throughout a wide range of current. Within the operating limits of the equipment, the voltage drop across the terminals of the glow valve 18 is independent of the variation in the supply voltage. Any difference between the voltage across the capacitor 16 and the voltage drop across the glow valve 18 is absorbed by the resistors 17 and 19.

The voltage across the glow valve 18 and the resistor 19 consists of two components of which the component across the glow valve 18 is constant and that across the resistor 19 is variable in proportion to the current which it conducts and, consequently, in proportion to the line voltage.

For the purpose of providing a reference voltage for controlling the speed of the motor 1, a potentiometer 20 is connected across the series connected glow valve 18 and resistor 19. There is thus impressed upon the potentiometer 20 a voltage having a constant magnitude component and a variable magnitude component. The potentiometer 20 is provided with a slider 20a by means of which a desired fraction of the total voltage drop across the glow valve and resistor 19 may be selected as the reference voltage for controlling the speed of the motor. Thus the voltage between the slider 20a and the positive supply conductor 6 is the reference voltage and it comprises a constant component and a variable component having the same proportion as that of the constant and variable voltage components across the glow valve and resistor 19.

A speed signal control voltage is derived from the armature voltage of the motor and is compared with the reference voltage and the difference is utilized to control the current in the saturating winding 11b of the saturable reactor in the phase shifting circuit and thus to control the firing point of the thyratrons 3 and 4. This comparison is effected by means of a circuit which is illustrated as comprising a high vacuum valve 21 and a voltage divider comprising two resistors 22 and 23 which are connected in series relationship between slider 20a and the negative armature supply conductor 7 and thus to the negative terminal of the armature 1a. The anode 21a of the valve 21 is connected to one terminal of the saturating winding 11b of which the opposite terminal is connected to the positive output terminal of the auxiliary rectifier 14 and cathode 21b is connected to the positive supply conductor 6 and thus to the positive armature terminal of the motor.

The control electrode 21c is connected to the junction point of the resistors 22 and 23 and thus there is supplied between the cathode and control electrode a voltage proportional to the difference between the reference voltage and the feedback voltage from the motor armature.

The comparison circuit responds to changes in the difference voltage to vary the firing point of the thyratrons in such sense as to counteract the speed change which produced the change in difference voltage and thereby maintains the armature voltage of the motor at a value corresponding to the position of the slider 20a.

Briefly, the operation is as follows. It may be assumed that the motor is operating at a speed corresponding to the position of the slider 20a and that owing to an increase in load, the speed of the motor decreases. This causes the countervoltage of the motor to decrease and the voltage of the negative armature terminal to become less negative with respect to the voltage of the positive terminal. As a result, the voltage supplied to the control electrode 21c becomes less negative with respect to the voltage of the cathode, thereby increasing the current in the anode-cathode circuit of valve 21. This increased current increases the saturation of the reactor 11 and thus advances the firing point of the thyratrons 3 and 4 to increase the voltage supplied to the armature of the motor. As the speed of the motor increases in response to the advance in the firing point, the negative armature terminal and, consequently, the control electrode 21c become more negative, thereby decreasing the rate at which the armature voltage approaches the preset value. This continues until a balanced condition is reached such that any further increase in the armature voltage would reduce the difference voltage between it and the reference voltage to such an extent that the firing point of the thyratrons would be retarded sufficiently to begin to decrease the armature voltage.

If the reference voltage were maintained constant and the alternating voltage of the supply line decreased, the armature voltage would be maintained constant and the voltage supplied to the field winding 1b would be decreased in proportion to the decrease in line voltage. This would decrease the field current and flux, and the speed of the motor would rise as illustrated by the curve 24 in Fig. 2 in which abscissae represent line voltage and ordinates on the left-hand axis represent speed of the motor. It is to be noted that under the conditions assumed, as the supply voltage varies approximately plus or minus 10%, the speed varies approximately minus or plus 5% respectively. This is attributable to the fact that the field is operating in a semi-saturated region and the variation in field flux is not directly proportional to the field current. Although the field flux is not exactly linear, it may be assumed to be reasonably linear so that the curve 24 may be considered to be approximately a straight line, over a limited variation of the line voltage. In a typical motor, the field flux and speed will vary approximately 5% in response to a change of 10% in line voltage.

The desired constant speed characteristic of the motor is represented by curve 25. In order to achieve this characteristic, the voltage supplied to the armature is increased in proportion to the line voltage as illustrated by the curve 26 of which ordinates on the right-hand axis represent armature voltage and abscissa represent line voltage. To hold constant speed under the conditions assumed, the armature voltage must increase approximately 5% in order to compensate for an increase of 10% in line voltage.

From the foregoing, it is clear that if the reference voltage is maintained constant, the motor speed will vary with line voltage changes as illustrated by curve 24. This undesirable speed variation is eliminated by the compensation produced by the variation in voltage drop across the resistor 19 in series with the glow valve 18 in response to changes in line voltage. As the line voltage varies, the current flowing in the circuit of the glow valve 18 and the resistor 19 will vary correspondingly. The voltage drop across the glow valve 18 will remain constant in accordance with its characteristic. However, the voltage across the compensating resistor 19 will vary with the current which it conducts and, consequently, it will vary in some proportion with the line voltage. The resistance of resistor 19 is chosen to produce in response to variation in line voltage a varying voltage drop which, added to the constant voltage drop across the glow valve, will produce a varying reference voltage between supply conductor 6 and slider 20 which varies approximately plus or minus 5% with a line voltage variation of approximately plus or minus 10%. Since the reference voltage is made to vary with the line voltage, the control functions to vary the armature voltage correspondingly and, therefore, in proportion to the change in field flux which results from such variation in line voltage. Thus the tendency of the speed of the motor to increase with decreasing line voltage and to decrease with increasing line voltage is effectively counteracted.

If a 5% variation in armature voltage for a 10% variation in line voltage does not produce the constant speed characteristic, the compensating resistor may be adjusted to produce exactly the amount of compensation required to maintain the speed of the motor constant.

Although in accordance with the provisions of the patent statutes, this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. In combination, a pair of alternating voltage supply conductors, a direct current motor having armature and field windings, means for supplying exciting current to said field winding comprising an uncontrolled rectifier having input terminals connected to said supply conductors and output terminals connected to said field winding, a source of direct reference voltage comprising positive and negative reference voltage buses, an electric glow valve having an anode connected to said positive bus and a cathode connected to said negative bus and having the characteristic of substantially constant voltage drop across said anode and cathode for all values of current within its operating range, means for supplying to the anode-cathode circuit of said valve a direct voltage derived from said alternating voltage supply conductors and proportional in magnitude to said alternating voltage, means for deriving a speed signal voltage from the armature voltage of said motor, a resistor included in the anode-cathode circuit of said valve for adding to said constant voltage drop of said reference voltage a component of direct voltage variable in magnitude with the voltage of said supply conductors to compensate for changes in the voltage of said supply conductors, and a rectifier controlled in response to the difference of said reference voltage and said speed signal voltage for supplying a direct voltage to said armature.

2. In combination, a pair of alternative voltage supply conductors, a direct current motor having armature and field windings, means for supplying exciting current to said field winding comprising an uncontrolled rectifier having input terminals connected to said supply conductors and output terminals connected to said field winding, a source of reference voltage comprising positive and negative reference voltage buses, an electric glow valve having an anode connected to said positive bus and a cathode connected to said negative bus and having the characteristic of substantially constant voltage drop across said anode and cathode for all values of current within its operating range, a second rectifier supplied from said alternating voltage conductors for supplying a direct voltage to the anode cathode circuit of said valve, means for deriving a speed signal voltage from the armature voltage of said armature, a rectifier controlled in response to the difference of said reference voltage and said derived voltage for supplying a direct voltage to said armature, and a resistor included in the connection between said cathode and said negative bus for varying said reference voltage to compensate for changes in the voltage at said supply conductors.

LEO H. DEE.

References Cited in the file of this patent

UNITED STATES PATENTS

| Number | Name | Date |
| --- | --- | --- |
| 2,522,520 | Knauth et al. | Sept. 19, 1950 |
| 2,558,086 | Herchenroeder | June 26, 1951 |